United States Patent [19]
Easter

[11] Patent Number: 5,500,773
[45] Date of Patent: Mar. 19, 1996

[54] VEHICLE MIRROR ALIGNMENT DEVICE

[76] Inventor: Basil O. Easter, 301 W. 28th Ave., Milan, Ill. 61264

[21] Appl. No.: 203,114

[22] Filed: Feb. 28, 1994

[51] Int. Cl.⁶ .......................... G02B 5/08; G02B 7/182; B60R 1/06; G01C 3/00
[52] U.S. Cl. .............. 359/838; 359/871; 33/264
[58] Field of Search ................... 359/838, 839, 359/850, 865, 871, 872; 33/264

[56] References Cited

U.S. PATENT DOCUMENTS

| | | | |
|---|---|---|---|
| 2,158,310 | 5/1939 | Smith et al. | 33/264 |
| 2,164,992 | 7/1939 | Isbell | 33/264 |
| 2,360,368 | 10/1944 | Rubissow | 33/264 |
| 3,565,566 | 2/1971 | Wetzel. | |
| 3,772,795 | 11/1973 | Calvet | 33/264 |
| 4,730,926 | 3/1988 | Wedemeyer | 33/264 |
| 4,971,430 | 11/1990 | Lynas | 359/877 |
| 5,022,747 | 6/1991 | Polanyi et al. | 359/872 |
| 5,050,977 | 9/1991 | Platzer, Jr. | 359/866 |
| 5,122,910 | 6/1992 | Polanyi et al. | 359/865 |
| 5,237,458 | 8/1993 | Polanyi et al. | 359/839 |

Primary Examiner—Ricky D. Shafer
Attorney, Agent, or Firm—Henderson & Sturm

[57] ABSTRACT

A device for aligning the exterior mirrors of vehicles utilizing a sight and target assembly. The device is secured to the front, inside edge of the mirror and provides an aperture through which the driver may view a target provided on the device only when the mirror is properly aligned. Alternately, the device may be secured to the rear of the exterior mirror with the target sighted through an window formed in the mirror.

3 Claims, 4 Drawing Sheets

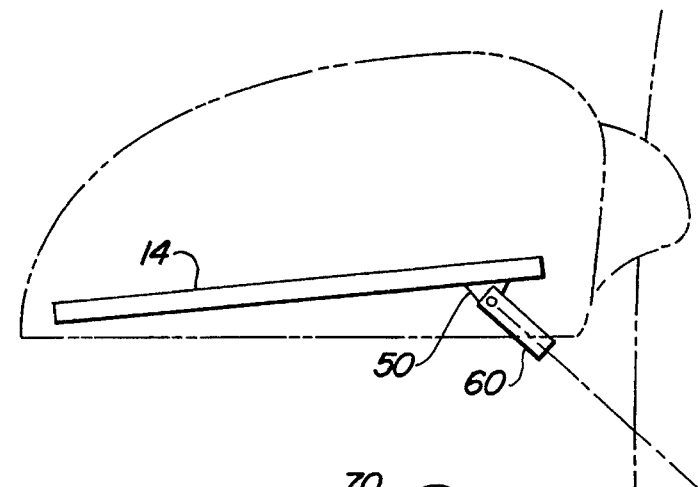
Fig. 3
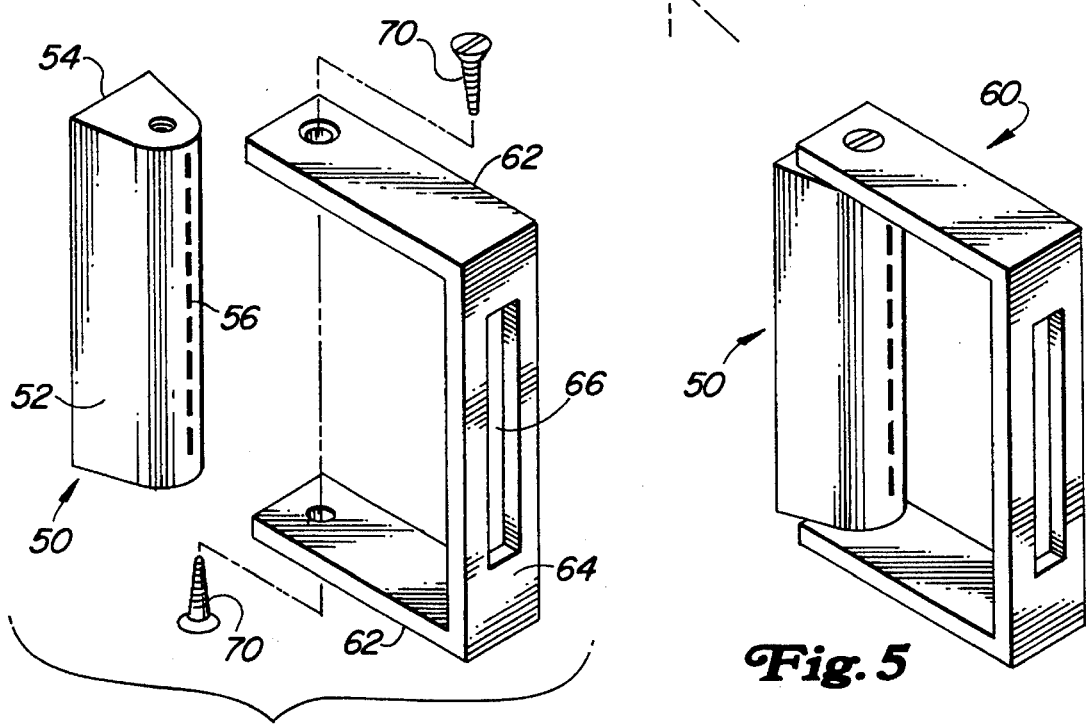
Fig. 4
Fig. 5
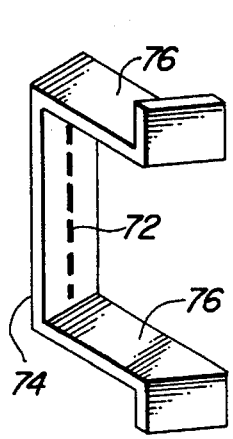
Fig. 6
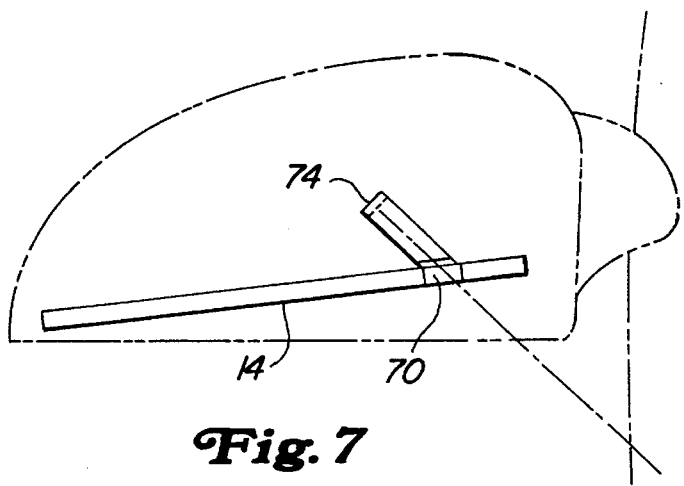
Fig. 7

VEHICLE MIRROR ALIGNMENT DEVICE

TECHNICAL FIELD

This invention relates to vehicle mirrors, and more particularly to a device for aligning vehicle exterior mirrors.

BACKGROUND ART

The driver of a motor vehicle must monitor other motor vehicles traveling in the same direction and behind or beside his vehicle. This is ordinarily accomplished by the use of an interior mirror and a pair of exterior mirrors. The interior mirror is mounted inside the vehicle in front of and to the right of the driver and provides the driver with a view of the area directly behind his vehicle. The exterior mirrors are mounted on the sides of the vehicle forward of the driver and provide the driver with a view of the areas to the sides and rear of his vehicle. A problem arises with these exterior mirrors because of their limited field of view which produces the well known "blindspots" alongside the vehicle. These blindspots are produced since the driver will typically align the exterior mirrors by rotating them outward until only a slight portion of the rear of the vehicle can be seen. Rotating them any further causes the driver to lose any lateral reference and thus to lose confidence in the alignment of the mirrors. This problem has been partially overcome with the use of a convex mirror on the right side of the vehicle which provides a much wider field of view. This remedy is however not acceptable on the left side of the vehicle because the convex mirrors greatly distort the driver's depth perception which is particularly critical on the driver's side. Several United States Letters Patent have issued which utilize a second mirror attached to the left exterior mirror which is used to sight some target on the vehicle, at which time the exterior mirror will be properly aligned.

DISCLOSURE OF THE INVENTION

The present invention discloses a device for aligning the exterior mirrors of vehicles utilizing a sight and target assembly. The device is secured to the front, inside edge of the mirror and provides an aperture through which the driver may view a target provided on the device only when the mirror is properly aligned. Alternately, the device may be secured to the rear of the exterior mirror with the target sighted through an window formed in the mirror.

BRIEF DESCRIPTION OF THE DRAWINGS

These and other attributes of the invention will become more apparent upon a thorough study of the following description of the best mode for carrying out the invention, particularly when reviewed in conjunction with the drawings, wherein:

FIG. 3 is a top plan view of a first embodiment of the invention;

FIG. 4 is an enlarged exploded view of the first embodiment;

FIG. 5 is an enlarged perspective view of the first embodiment;

FIG. 6 is an enlarged perspective view of a second embodiment of the invention;

FIG. 7 is a top plan view of the second embodiment of the invention;

DESCRIPTION OF THE PREFERRED EMBODIMENTS

Figure 1:
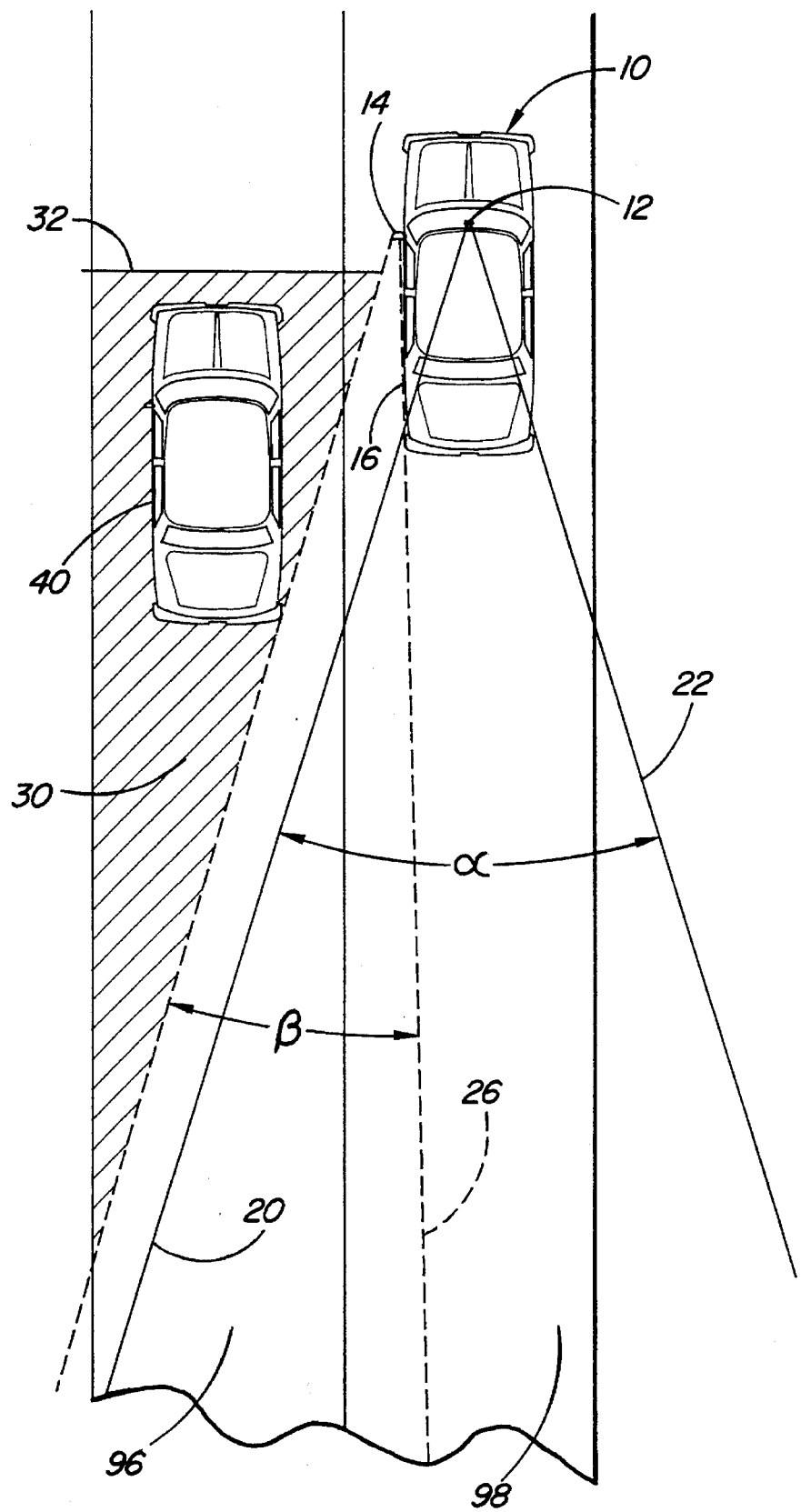
FIG. 1 is a top plan view of two vehicles traveling in the same direction on a highway and depicts the standard mirror viewing angles of the forward vehicle which is equipped with an interior and an exterior mirror.

Referring now to the drawings, wherein like reference numerals designate identical or corresponding parts throughout the several views, FIG. 1 is a top plan view depicting two vehicles traveling in the same direction on a divided, four-lane highway. The front vehicle 10, traveling in the right lane 98, is about to be passed by a second vehicle 40, traveling in the left lane 96. The front vehicle 10 has an interior mirror 12 and an exterior mirror 14, the fields of view of which are depicted by angle α subtended by solid lines 20 and 22 for the interior mirror and angle β subtended by dashed lines 24 and 26 for the exterior mirror. In this situation, the exterior mirror 14 has been aligned in the standard manner during which the mirror is rotated outward until only the left rear edge 16 of the vehicle 10 may be seen in the mirror. As is clear in FIG. 1, this method of aligning the exterior mirror 14 creates a large area of overlap between fields of view α and β while also creating a large blindspot 30. This blindspot extends from the edge of the driver's peripheral vision, depicted by line 32, back to line 24, the left edge of field of vision β. This blindspot 30 is depicted by a series of parallel 45 degree lines and may be seen to completely encompass vehicle 40.

Figure 2:
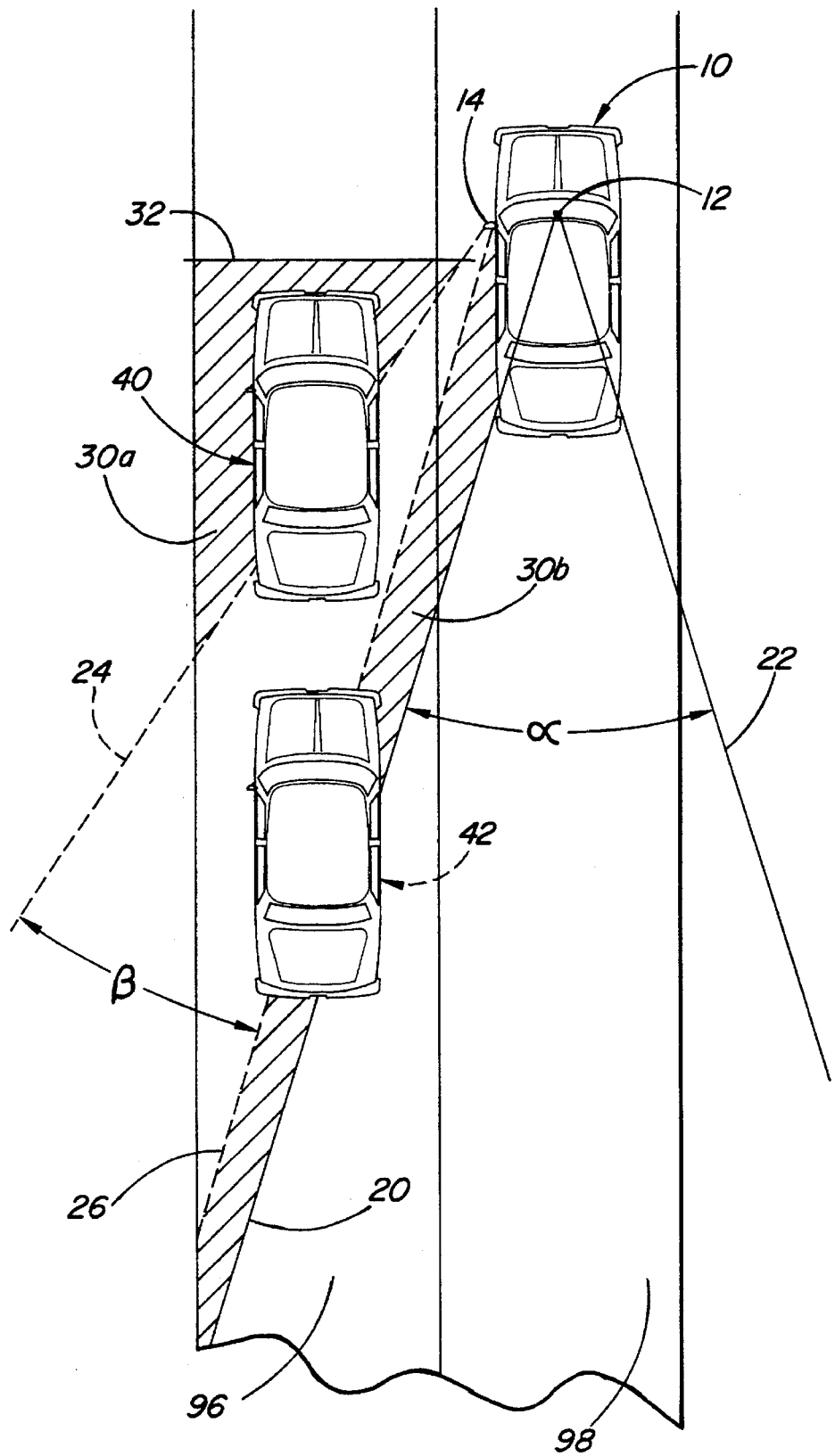
FIG. 2 is a top plan view of three vehicles traveling in the same direction on a highway and depicts the mirror viewing angles utilizing the present invention.
Figure 8:
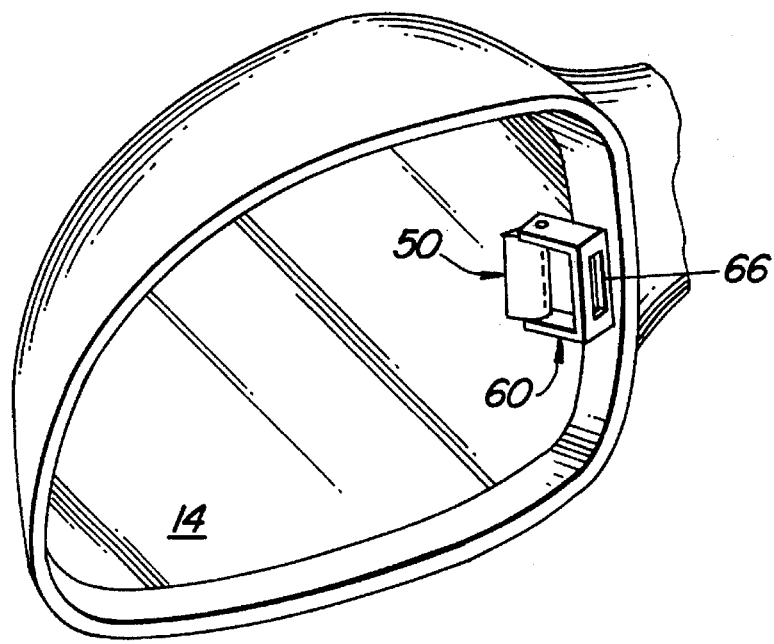
FIG. 8 is a perspective view of a first embodiment of the invention.

FIG. 2 is a top plan view similar to FIG. 1 depicting a third vehicle 42. In this situation, exterior mirror 14 of front vehicle 10 has been adjusted in accordance with the present invention, to be discussed further below. As may be seen, field of view β of mirror 14 is now rotated outward relative to the vehicle, thus bringing vehicle 40 into view of exterior mirror 14. The original blindspot 30 is not eliminated, but is rather cut into two smaller blind areas 30a and 30b, neither of which is large enough to hide a vehicle. As shown, third vehicle 42 is partially within blind area 30b, but may be seen by both the interior mirror 12 and the exterior mirror 14.

A first embodiment of the invention, preferably fabricated from plastic, is shown in FIGS. 3, 4, 5 and 8. A base 50 having a somewhat semi-circular front surface 52 and a flat rear surface 54 is secured to the front of exterior mirror 14 near the inner edge of the mirror by means of an adhesive on the flat rear surface 54. Midway around front surface 52 and running lengthwise thereon is an alignment target 56 printed onto or etched into surface 52. In a preferred embodiment this alignment target 56 is of a fluorescent material so that it may be more easily seen. Pivotally attached to base 50 by means of a pair of screws 70 is an alignment sight 60 comprising a pair of pivot arms 62 which hold vertical member 64 in a spaced apart relationship in front of the base 50. Vertical member 64 has a rectangular aperture 66 formed therein, through which the alignment target 56 is viewed when aligning the mirror 14.

The first embodiment of the invention is utilized as follows. First the device is secured vertically near the inner edge of the exterior mirror 14 by means of the adhesive on the rear surface 54 of base 50. The mirror 14 must then be adjusted to the proper position as depicted in FIG. 2 so as to eliminate any blindspots within which a vehicle may not be seen. This could be accomplished safely with the vehicle parked on a side street with other vehicles driving past. Once the mirror is properly positioned, the vertical member 64 is pivoted on base 50 until the alignment target 56 may be seen through aperture 66. The screws 70 are then tightened to prevent further movement of pivot arms 62. When another person who wishes to drive the vehicle must move the seat forward or rearward, they then simply realign the mirror 14 so that the alignment target 56 can once again be seen through the alignment aperture 66.

Figure 9:
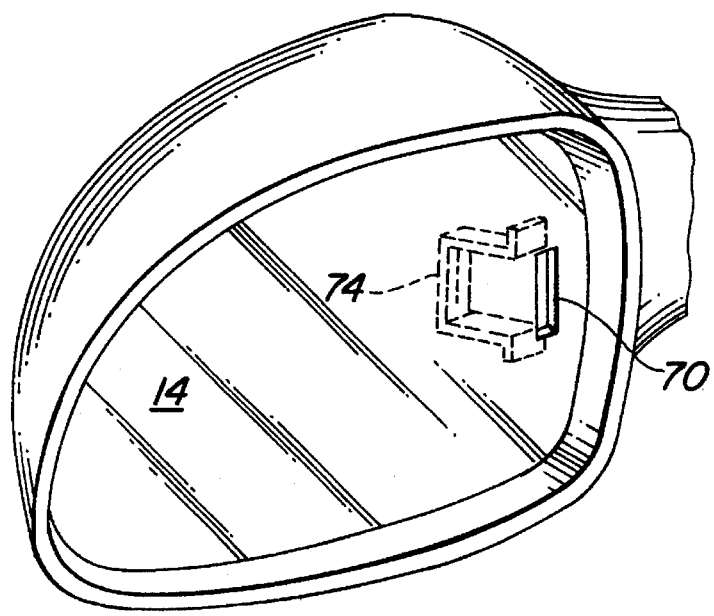
FIG. 9 is a perspective view of a second embodiment with the invention shown in dashed lines behind the mirror.

A second embodiment of the invention is shown in FIGS. 6, 7 and 9. In this embodiment, the sighting aperture 70 is a non-reflecting, transparent vertical window near the inner edge of the mirror 14 itself. The alignment target 72 is printed onto or etched into vertical member 74 which is held in a spaced apart relationship behind the rear surface of the mirror 14 by a pair of arms 76 which are secured, as by adhesive, to the rear of the mirror. It is envisioned that this embodiment would be a part of the original mirror assembly and pre-aligned during manufacture. Mirror alignment would be as described above, simply requiring the movement of the mirror until the alignment target 72 is seen through the sighting aperture 70.

Obviously, many modifications and variations of the present invention are possible in light of the above teachings. It is therefore to be understood that, within the scope of the appended claims, the invention may be practiced otherwise than as specifically described.

I claim:

1. A device for use in aligning a vehicle exterior mirror, comprising:

(a) a vehicle exterior mirror; and (b) means, affixed to said mirror, for aligning said mirror, wherein said mirror alignment means comprises an alignment sight and an alignment target affixed to said vehicle exterior mirror, said alignment target including a base secured to the front of said mirror, said base supporting said alignment sight in a spaced apart relation from said target, wherein said alignment sight is pivotally attached to said base.

2. The device as recited in claim 1 wherein said mirror alignment means comprises a transparent window within said vehicle exterior mirror and said alignment target is affixed to and spaced behind said window.

3. A device for use in aligning a vehicle exterior mirror, comprising:

(a) a vehicle exterior mirror;

(b) an alignment target comprising a support base secured to the front of said mirror, and (c) an alignment sight pivotally attached to and spaced in front of said support base.

* * * * *